Dec. 18, 1928.
K. DAVIS
1,695,369
MECHANISM AND PROCESS FOR SEPARATING INTERMIXED DIVIDED MATERIALS
Filed Dec. 8, 1921     5 Sheets-Sheet 3
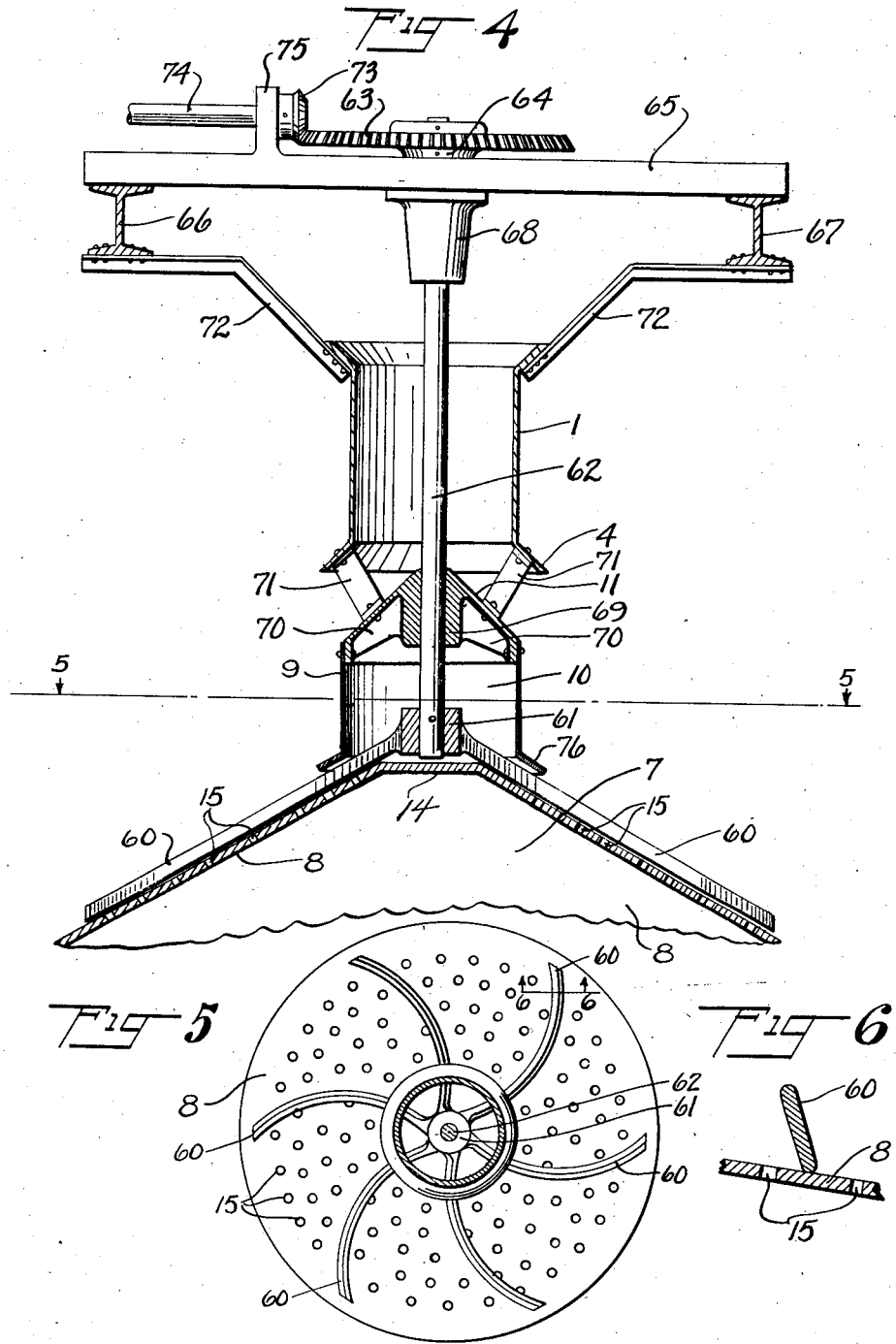

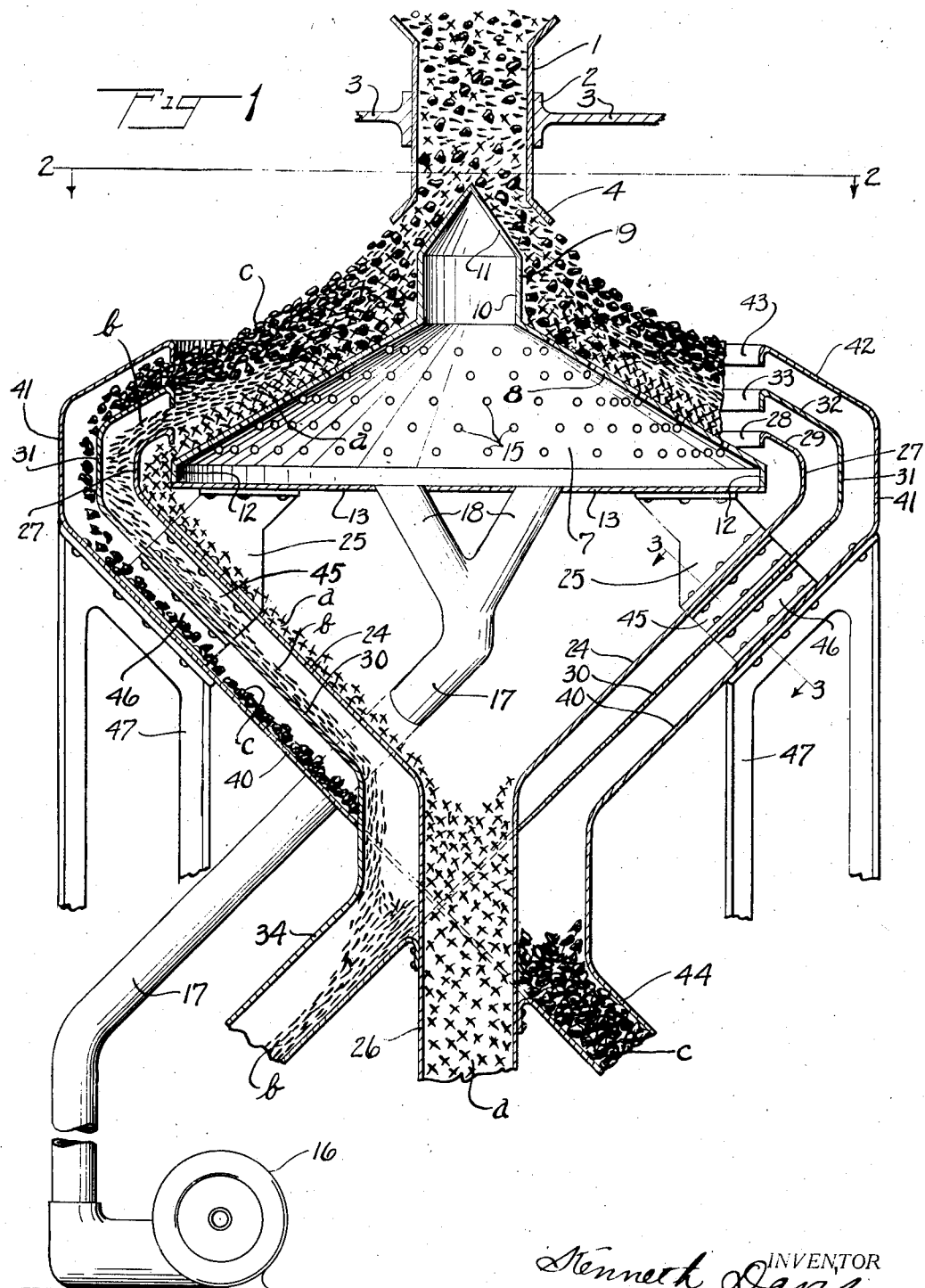

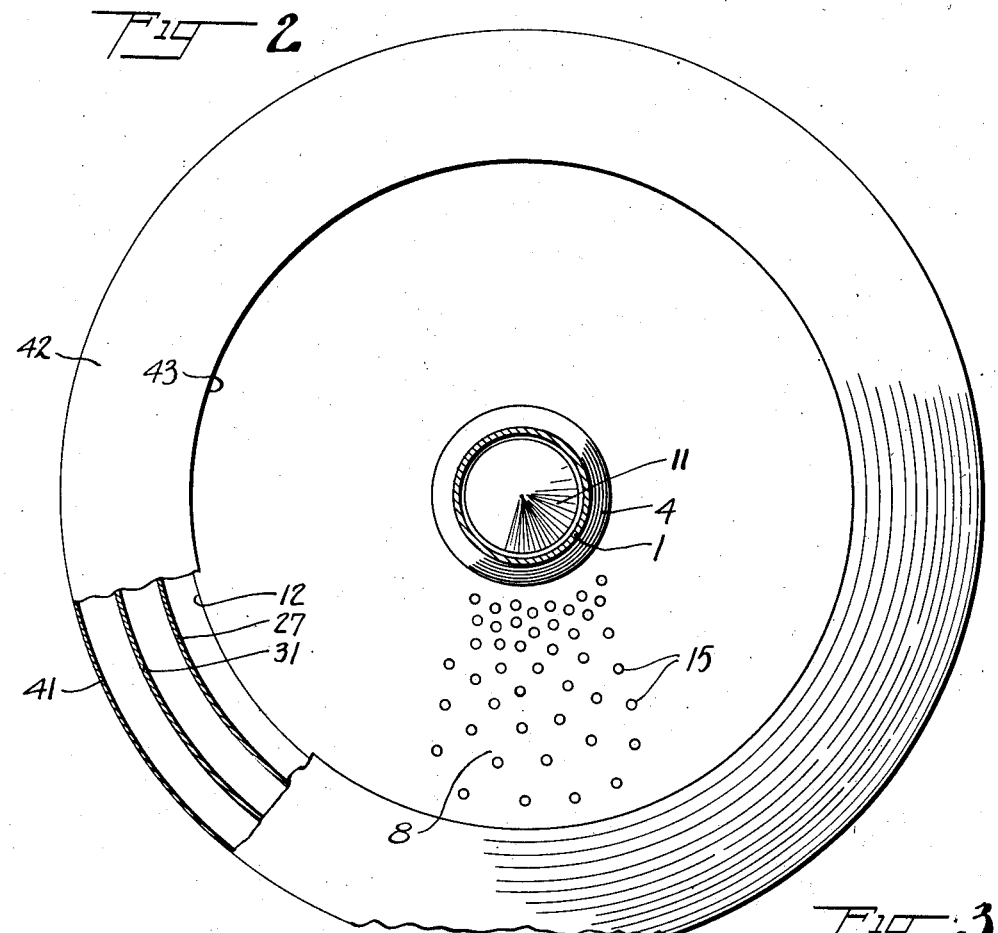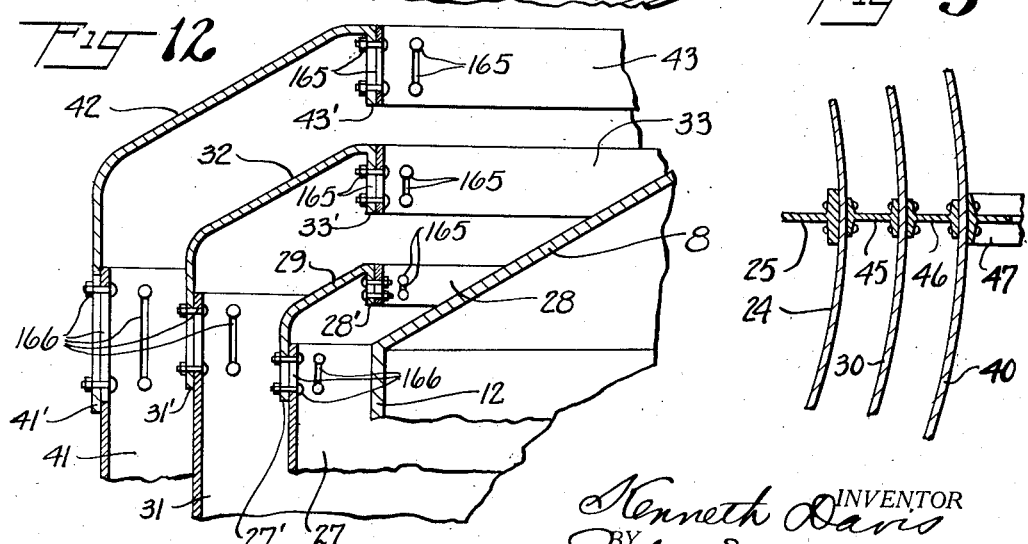

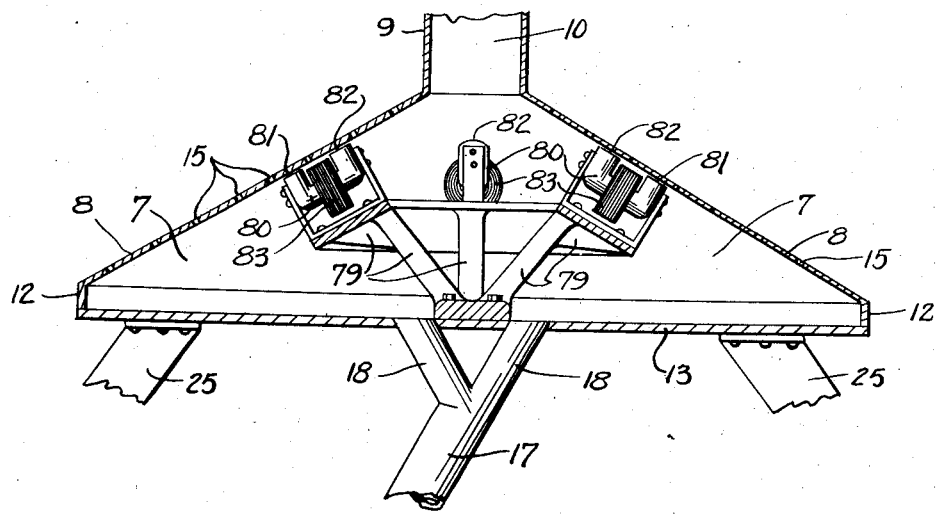
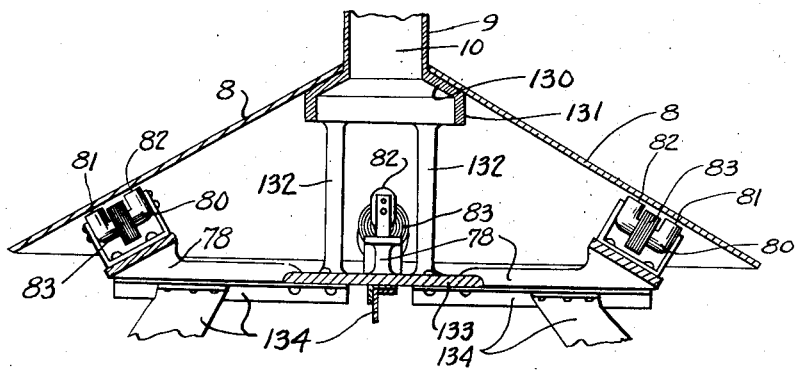
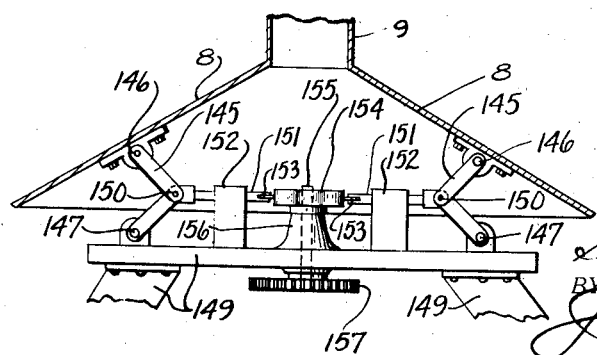

Dec. 18, 1928.
K. DAVIS
1,695,369
MECHANISM AND PROCESS FOR SEPARATING INTERMIXED DIVIDED MATERIALS
Filed Dec. 8, 1921
5 Sheets-Sheet 5
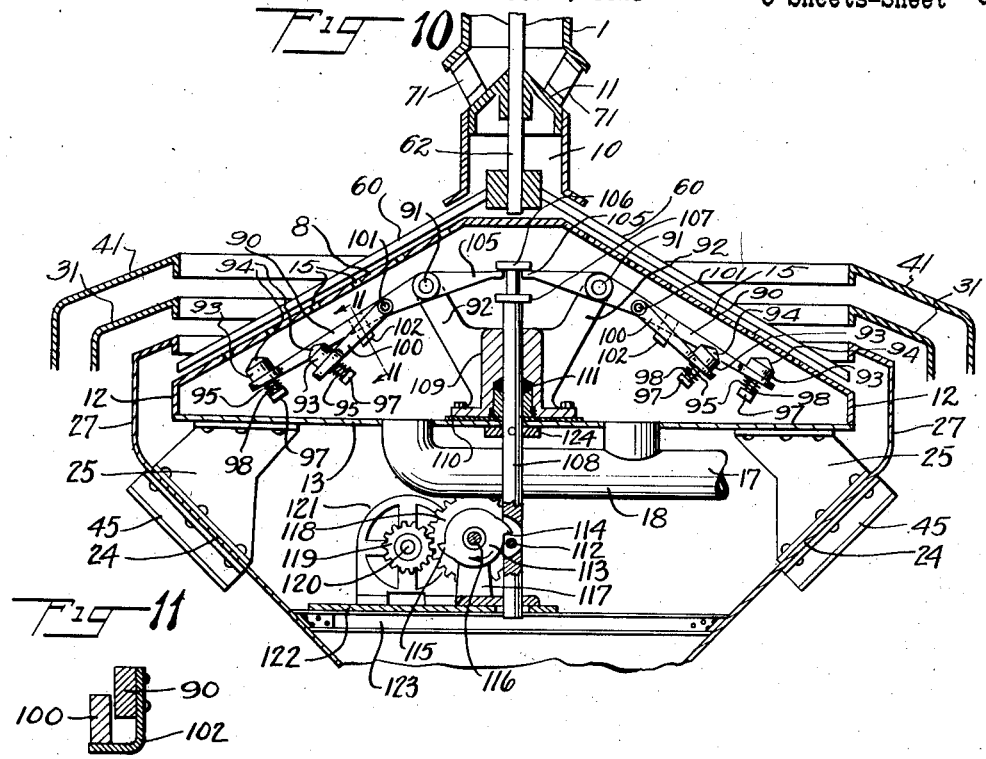

Patented Dec. 18, 1928.

1,695,369

UNITED STATES PATENT OFFICE.

KENNETH DAVIS, OF ST. BENEDICT, PENNSYLVANIA, ASSIGNOR, BY MESNE ASSIGNMENTS, TO PEALE-DAVIS COMPANY, OF WILMINGTON, DELAWARE, A CORPORATION OF DELAWARE.

MECHANISM AND PROCESS FOR SEPARATING INTERMIXED DIVIDED MATERIALS.

Application filed December 8, 1921. Serial No. 520,932.

The invention relates to a novel process and mechanism for separating two or more divided and commingled loose materials, and more particularly and in detail it relates to a novel process and mechanism for separating such materials through differences in their respective specific gravities.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

Of the drawings:—

Fig. 1 is a central vertical section of a mechanism embodying the invention;

Fig. 2 is a full horizontal section on the line 2—2 of Fig. 1 with parts broken away and other parts in horizontal section so as to show the discharging passages for three different materials;

Fig. 3 is a fragmentary section taken on line 3—3 of Fig. 1;

Fig. 4 is a fragmentary view, corresponding to the upper and central part of Fig. 1, but showing mechanical devices for acting on the materials being separated;

Fig. 5 is a horizontal section and plan taken on the line 5—5 of Fig. 4;

Fig. 6 is an enlarged, fragmentary section taken on line 6—6 of Fig. 5;

Fig. 7 is a fragmentary view corresponding to a portion of the upper central part of Fig. 1, but showing electro-magnetic means for vibrating material which is being separated;

Fig. 8 is a view similar to Fig. 7, but showing the electro-magnetic vibrating means operating without the air pressure;

Fig. 9 is a vertical, fragmentary central section, corresponding to the upper central part of Fig. 1, of a form of mechanical agitating means;

Fig. 10 is a fragmentary view corresponding to a portion of the upper and central part of Fig. 1, but showing mechanical means for effecting the vibration of the separating support;

Fig. 11 is a detail section on the line 11—11 of Fig. 10;

Fig. 12 is an enlarged, fragmentary vertical section of the strata regulating and the discharge means shown in Fig. 1, but showing the means for regulating and varying the action on the stratified material;

Fig. 13 is a fragmentary top plan of a modified form of separating support;

Fig. 14 is a vertical fragmentary section taken on line 14—14 of Fig. 13, and showing the vibrating means of Fig. 10 operating without the air pressure; and Fig. 15 is a fragmentary, enlarged section taken on line 15—15 of Fig. 13.

The invention is directed more particularly to the separation of intermixed, divided materials, the materials being approximately sized, a good example of such material being "run of the mine coal" which has been screened to render the pieces or fragments of material of approximately the same size. This consists of good coal, rock, and bone (which is a combustible material, but having a much higher ash-content than the coal).

The separation is effected broadly by means acting through the difference in the specific gravity of the different materials while they are to a greater or less degree under the impulsion of gravity, the materials gradually flowing or moving forward onto and over a support of greater area, whereby the material is rendered less compact and the layers gradually become more definitely and completely separated. When they are completely separated, they are discharged or conveyed away, each in or by separated conveying means.

More in detail, the intermixed divided materials are fed gradually, and in a layer of proper thickness, over and down a preferably conical or conoidal support, the material being meanwhile agitated, either upon or with the support, so that the pieces or fragments change their relative positions, those of greater specific gravity stratifying at the bottom and those of lesser specific gravity stratifying above.

The material during this action gradually moves outwardly and downwardly along the support, the separation and consequent stratification becoming progressively more complete and distinct, the separated materials finally passing off in the completely separated and stratified condition over the periphery of the support, and in so doing are received into separate chutes or conveyors and are separately carried away.

It will be understood that the foregoing general statement and also the following detailed description are exemplary and explanatory and are not restrictive of the invention. Other features of the invention will be first set forth in connection with the following detailed description of the present preferred embodiment of the invention.

Referring now in detail to the embodiment of the invention illustrated by way of example in the accompanying drawings, and referring for the present to Figs. 1 and 2, means are provided for subjecting the intermingled materials to the combined action of gravity and means operating through or upon the differences in the specific gravities in the intermingled materials to effect their separation. The intermingled materials, for example, may be considered as coal, "bone" and rock constituting the run of the mine. In said embodied form, the intermixed materials are fed in through a vertically disposed, preferably cylindrical passageway 1 from any suitable source of supply, and they are thereby directed in a gradual and continuous progress to the separating mechanism. The chute 1 is supported in any suitable manner and as shown, a collar 2 encircles and is fastened to the chute and is in turn supported on arms 3, which are attached to any fixed support.

As embodied, the separating mechanism comprises a preferably conical or conoidal support 8 upon or with which the commingled divided materials are agitated in effecting the separation and stratification as the material gradually passes down the member 8 towards its periphery. One of the agitating means, which may be employed selectively or collectively, is air. Accordingly, pursuant to this feature of the invention, in Figs. 1 to 4, the support 8 is pervious to air or other fluid under pressure. In accordance with other features of the invention, as later explained, the support 8 may be subjected to vibratory, jogging, or other motion, and in many instances and with various materials, it will be found preferable to utilize the two actions together. As shown in Fig. 1, the material is subjected to the combined action of gravity and of air pressure working against the gravity to simultaneously separate and stratify the intermixed materials, while progressing the materials so as to spread over a greater area and thereby assist in the separating action.

In the preferred embodiment, and as shown in Figs. 1 and 2, the material is fed to the central part of the conical or conoidal support 8, as by the chute 1, and progresses thence outwardly over the support and toward and over the periphery thereof. Preferably there is located at the central part of the conical or conoidal member 8 a part 9, projecting upwardly toward or into the bottom of chute 1, and designed to spread out and uniformly distribute the descending intermingled materials gradually and equably in all directions. The bottom end 4 of chute 1 is preferably flared outwardly over the member 9.

As embodied, the upper part of member 9 is formed with a vertical cylindrical portion 10 and a top or conical portion 11, the latter preferably being within but spaced away from the bottom part 4 of the chute 1. This all assists in effecting both the uniform spread and the outward direction of the intermingled materials with a certain degree of fall, although the member 9 can be entirely conoidal if desired.

For the purpose of creating and directing the air pressure, the member 8 is part of a closed chamber 7, having side walls 12 and a bottom 13, and if desired, a partition 14 cutting off the member 10. The member 8 is provided with a very large number of perforations 15, which may be of a size, number and relative location adaptable to the most efficient work with any particular intermingled materials, as may be readily ascertained by tests or deduced from experience.

In the embodied form of supply for the air or other fluid under pressure, a blower or pump 16 is provided, which may provide steady or intermittent or pulsating pressure, the air under pressure being conveyed through a pipe 17 and through a series of branch pipes 18 into the chamber 7, which is thereby maintained under air pressure, the air being projected through the holes 15 in the support 8 into and through the materials which are being separated.

In accordance with one feature of the invention, the separated materials are taken off as separated and stratified at a plurality of points around the periphery of the separating support, and are preferably taken off substantially or entirely around the periphery, and are conveyed away to suitable separate receptacles. Means are, therefore, provided for receiving the materials of different specific gravities, and correspondingly stratified, at the outer periphery of the mass of material and for so conveying them separately away. Referring first to the embodied form of means for receiving the heaviest material (which in the present exemplary case would be the rock) at the edge of the support 8, there is provided a funnel-shaped member 24, located about and beneath the periphery of the separating member 8, the latter being supported from the top edge of the funnel by spacing and supporting members 25 riveted or bolted to the funnel and to the separating support. The funnel 24 at its lower end communicates with a chute 26 which may empty onto a conveyor belt, into a car, or any other suitable receiving means or device. At its upper end funnel-like member 24 is formed into a short cylindrical portion 27, surrounding the periphery of the separating surface 8. Above the part 27 the receiving member is formed into an upwardly inclined conoidal part 29 which terminates in a downwardly bent, vertically disposed, annular sheet or wall 28, which serves to hold back and to assist in forming the strata.

Means are provided for receiving the next superior stratum or layer of separated material at the periphery of the support 8. As embodied, the mechanism is shown operating upon three intermingled materials, and means are provided for limiting, directing and receiving the respective superior separated layers, be they one or more, of the separated and stratified materials, and said means as embodied comprise retaining walls encircling the respective layers of materials and orifices or passageways through which the separated materials pass away. The walls and openings in size, height and location correspond to the thickness of the respective layers, so that each layer is retained and maintained at its outer periphery, and the separated material is fed or progressed into the corresponding discharge opening at substantially the same rate as it is fed in as a constituent of the intermixed materials. The retaining walls for the strata and the openings for feeding off the materials therefrom are preferably made adjustable as will be later described in detail.

As further embodied in the present instance, and referring now to the second or intermediate layer of the separated materials (which in the exemplary instance would be the "bone"), a more or less funnel-shape member 30 surrounds the member 24, and at its upper end terminates in a cylindrical portion 31, surrounding but spaced away from the part 27, the space therebetween serving as a passageway for the "bone." From the cylindrical portion 31, this member extends inwardly and slopes upwardly as shown at 32, and this part 32 terminates in a downwardly bent, vertically disposed, annular wall 33, which may be similar in construction and function to the wall 28, serving to cooperate in the stratification and retention of the separated materials and in regulating the feeding off thereof. These parts may be made variably positionable, one embodiment of which will be later described. The funnel-like material-directing member 30 discharges into a chute 34, which in turn discharges into any suitable form of disposing means.

Means are likewise provided for similarly controlling the stratification and the flow or discharge of the lightest material (which in the case being considered would be the coal), and as embodied, this is effected in connection with receiving and conveying-away means generally similar to those already described. Surrounding or enclosing the funnel-like member 30 is another funnel-like member 40, having its upper part formed into a cylindrical wall 41, spaced away from and surrounding the wall 31, the space therebetween serving as a passageway for the separated coal or other corresponding material.

The upper part of this member also is bent upwardly and inwardly as shown at 42, and this part 42 terminates in a downwardly bent, vertically disposed, annular plate or wall 43, generally similar in structure and function to the members 28 and 33 already described. This member is variably positionable like the other two, as will be later described, and while the three are shown disposed in substantial vertical alinement, their relative positions may be varied as found advisable or desirable in different installations, and in treating different materials in order to effect the separation and stratification in the most thorough and efficient manner. The member 40 discharges into a chute 44, which in turn discharges the material into any suitable form of delivering means.

Suitable supporting and spacing means for the structures just described are provided, and as embodied supports 45 and 46 of I-beam section are positioned, respectively, between the members 24 and 30 and 30 and 40, in alinement with the members 25, and in alinement also with corresponding external frame members 47 the flanges of the frame, and the I-beams and member 25 being riveted or bolted together as will be seen from Figs. 1 and 3. The supports 25 will be shaped proportioned and arranged so as not to interfere with the vibrational action of the separating support 8.

The manner of operation of the mechanism just described is substantially as follows:—

The intermingled materials are fed in through the chute 1 and the member 9 directs them equally or uniformly in all directions from a central, vertical axis, onto the separating surface 8. The materials upon the separating member 8 gradually slide downwardly therealong by the action of gravity, and simultaneously therewith are subjected to the upward pressure or impulsion from the air which is blown out through the separating member 8. This gradually works the lighter material to the top, the material of intermediate weight to the middle, while the heaviest material works to the bottom upon the member 8. Additionally, as the material moves downwardly along the separating member 8 it becomes less dense owing to the increase in area of the member 8 as the distance from its center increases.

Thus the materials become gradually separated from each other as they approach the outer periphery of the separating member 8. The heaviest material, indicated by $a$, which would be the rock, passes immediately over the outer edge of the member 8 and into the funnel 24 and is conveyed away. The intermediate materials, which in the case under consideration, would be the "bone" $b$ would pass out through the opening between the walls 28 and 33, over plate 29, into the space between walls 27 and 31, and down through the funnel 30 to a separate place of discharge. In like manner, the lightest material $c$, which in this case would be the coal, would pass out between walls 33 and 43, and over the plate 32, and into the space between the walls 31 and 41 down into the funnel 40 and away through the chute 48. The various controlling means for regulating the discharge of the material have already been described and their variable positioning to provide for control of the stratification and cleaning will be described later.

Means are provided for mechanically agitating or otherwise assisting the movement of the materials along the surface of the separating member 8, if desired, and the use or omission of such means may have a more or less determinative effect in any particular case upon the inclination of the member 8. In one embodied form of said means a series of blades travel over the surface of the separating member 8 and move the material around and down the member and also vertically move or lift and drop the material. As shown, a plurality of arms 60 are mounted on a hub 61, and are shown of more or less evolute form, and are curved to such degree as may be required to impart the desired movement both outwardly and along and around the separating member 8.

As embodied hub 61 is fixed on a shaft 62, which has fixed to the upper end thereof a bevel gear wheel 63, having a hub 64 resting on a support 65, which support is carried on girders or plates 66 and 67. A long bearing 68 is provided about the shaft 62 to prevent side strains or sidesway. Also, if desired, an additional bearing 69 may be provided for the shaft 62 within the member 9, the shaft passing through the apex of the member 9.

As embodied, the bearing 69 is carried in a supporting structure 70 fastened to the inner surface of the member 9, and a spacing member 71 may be fastened to the external surface thereof and also to the chute 1, the members 70 and 71 being riveted together. The chute 1 is also shown connected by supports or stays 72 fixed to the girders 66 and 67. Meshing with gear wheel 63 is a bevel pinion 73 fixed on a shaft 74, mounted in a bearing 75, and receiving power in any suitable manner and from any suitable source.

Thus, the arms 60 as they rotate, preferably relatively slowly over the surface of the separating member 8 will assist in moving the material downwardly therealong, and will likewise assist in the separating action, as they will cause the ascending air currents to have a more efficient action in driving the lighter material upwardly through the mass of material and thus assist in the stratification and separation.

The agitating blades 60, if desired, and as will frequently be found advisable, may be inclined more or less to the vertical, so as to have a vertical component of motion with respect to the agitated materials to be stratified and separated, as well as to have a motion around and down the support 8. In Fig. 6 a blade 60 is shown with such an inclination. Thus as the blades rotate, the pieces of material will repeatedly be lifted and permitted to drop. In certain cases and with certain materials it may be found sufficient to employ the mechanical agitating means without the air pressure.

In will be understood that the member 9 in this instance is spaced away from the separating support 8 to permit the extrusion and the movement of the agitating blades 60, the lower part 76 of the member 9 being flared outwardly and spaced away from the support 8 as stated, and the member 9 being supported from above.

Means are provided by the invention for otherwise or additionally vibrating the separating support 8, and in accordance with various features of the invention, these means may be either electrical or mechanical, and these may be utilized either with the air pressure and the material moving arms, or equivalent devices, or without them, as may be most desirable and efficient in handling or effecting the separation of different materials or a material in different conditions.

In Fig. 7 electro-magnetic means are shown for vibrating the separating member 8, being utilized in connection with the air pressure, and in Fig. 8 such means are shown employed separately from the air pressure device. As embodied, a plurality of magnets 80 are supported on a frame 79 carried on the bottom 13 of the air pressure chamber. The magnets have poles 81 and 82, and windings 83 and are located beneath the member 8, and in Fig. 7 these are shown within the air pressure chamber 7 and working with the air pressure. If desired, the magnets may be supplied with alternating current, the pulsation of the current being depended upon to effect the vibratory action, or current interrupting and controlling devices may be employed of any suitable form, and timed in any suitable manner.

In Fig. 8 the electro-magnetic vibration effecting means are shown without the air pressure chamber being used. The magnets in this case are mounted on supports 78 carried on a frame 134 and with other structures which are all later described.

In Figs. 10, 11 and 14 mechanical vibration effecting means are shown, likewise operating alternatively with and without the air pressure. As embodied, a plurality of arms 90 are pivoted at 91 upon a support 92, the arms being arranged preferably approximately radially about beneath the separating support 8. Near the ends of the respective arms 90 are shown impacting members 93, having preferably ends or points 94 of relatively small area. In the present preferred mounting the impacting members 93 are loosely mounted on the arms 90 by means of shanks 95, fitting loosely in apertures formed in the arm, the shanks having heads 97, for the purpose of limiting their movement relatively to the arms. Springs 98 may, if desired, be coiled in compression between the arm 90 and the respective heads 97, but usually will not be required.

In accordance with one feature of the invention there are a plurality of impactors or hammers 93 for each arm 90, and as embodied an arm 100, in the end of which a hammer 93 is mounted, is pivoted at 101 upon the arm 90, and in its rest position is supported by a lug or bracket 102 fixed on arm 90.

In the embodied form of actuating means, the arm 90, beyond its pivot support 91 terminates in a tail 105 which projects into the space between collars 106 and 107, fixed to and spaced apart upon a longitudinally disposed and vertically reciprocable rod 108. The rod 108 is reciprocably guided in a frame 109, which frame is supported upon and bolted to the bottom 13 of the air pressure chamber 7, a gasket 110 being preferably interposed therebetween. A suitable stuffing box 111, located either at the top or bottom of frame 109, may also be employed if desired, but usually will be found unnecessary.

Suitable means will be provided for rapidly and forcefully reciprocating the rod 108 longitudinally to cause the hammers 93 to strike sharply and heavily against the separating support 8. This means may be of any desired form, and as shown a pin 112 is fixed to the shaft 108, and this cooperates with a rotating disc 113 provided with teeth 114 and 115. Disc 113 is fixed on a shaft 116 journaled on a suitable support 117. Fixed also on shaft 116 is a gear wheel 118, with which meshes a pinion 119 fixed on a shaft 120 of a motor 121, which is supported on a floor 122 carried on I-beams 123 which may be fixed to and supported from the member 24, or in any other suitable manner. A stop 124 limits the upward movement of rod 108 and the corresponding downward movement of the hammers.

The manner of operation of the mechanism just described is substantially as follows:—

As the shaft 116 is rotated by the motor 121, the teeth 114 and 115 will engage successively with the pin 112 and will move rod 108 quickly and forcefully downwardly, thereby swinging the hammers forcefully against the underside of the separating support 8. As each tooth, successively, rotates clear of the pin 112, the hammers will fall back, and lift the shaft 108 into position to be actuated by the next tooth 114 or 115. Thus the separator is subjected to forceful and rapidly intermittent vibration to assist in the stratification and separation of the material.

In Fig. 14, the mechanism just described is shown applied to a separating support without the use of the air pressure. In this construction (and also in Fig. 8), the separating member 8 is preferably supported so as to have a maximum of vibration, and as shown is supported at its upper end upon a conoidal support 130, which may be conveniently an enlargement and continuation, in this instance, of the member 9 and may continue downwardly in an annular or cylindrical part 131, which in turn terminates in the legs 132 (see Fig. 8), fixed upon, or formed integral with, a base plate 133 mounted on a general frame 134.

Further features are shown, utilizable if desired, to provide greater vibrational effect. In Fig. 13, the conical or conoidal support 8 is shown in sectional form, being shown in four separate parts, each of which is free to vibrate with respect to the others. These parts may be formed at their abutting edges so as to prevent the material passing therethrough while leaving the different sections free to vibrate, one form of such joint being shown at 135 in Fig. 15.

In accordance with one feature of the invention the separating support 8 may be mounted and actuated to have bodily jogging or undulating movement, which may also operate progressively about the support. As at present preferably embodied, the support 8 is mounted upon a plurality of toggle levers 145, with their upper ends pivoted at 146 to the under side of the support 8, and with their lower ends pivoted at 147 upon the supporting frame 149. The respective knuckles 150 of the toggle levers are pivoted to longitudinally reciprocable rods 151, which rods are mounted in guiding supports 152 and are provided at their internal ends with cam rollers 153, cooperating with a cam 154. The cam 154 is fixed on a shaft 155, mounted in a bearing 156, which is carried upon the frame 149. Fixed also to shaft 155 is a gear wheel 157, which is driven by any suitable power. The cam 154 may be shaped so as to actuate or reciprocate the rods 151 to secure the kind and degree of movement, and the desired timed relation, so that the proper motion may be imparted to the separating support 8, which will be found most efficient with any particular kind and condition of materials to be separated.

In Fig. 12 of the drawings is shown a form of means (already referred to generally), whereby the height of the strata retaining and determining walls, and of the discharge apertures for the various stratified and separated materials are varied and regulated as desired. In this form the walls 28, 33 and 43, respectively, are separate and are carried by bolt and slot connections 165 on corresponding walls 28', 33' and 43', these latter walls being the continuation of the cylindrical parts 27, 31 and 41, respectively, already described. By this means the height of these respective retaining walls or rings may be varied as desired for the most efficient action with the different materials or condition of materials, and under different conditions of operation, such as operating upon wet and dry materials.

Not only may the height of the strata retaining and determining walls be varied as desired, but the discharge apertures therebetween may also be varied in size, and the height of the walls and the size of the discharge openings may also be varied with respect to each other. For the purpose of permitting these variations, the parts are made further variably positionable, as shown in Fig. 12. Therein, the parts 29, 32 and 43, respectively, join onto cylindrical portions 27', 31' and 41', which are separate from, but which encircle and fit against the top edges of the respective cylindrical portions 27, 31 and 41, these latter in this case are cut off at their top edges. These parts are connected together by bolt and slot connections 166, so that the entire upper structures may be raised and lowered with respect to the supporting cylindrical members 27, 31 and 41, and the strata retaining and determining walls 28, 33 and 43 may independently and additionally be positioned in respect to their respective supporting structure. It will be seen that the size and position of the walls and of the apertures may thus be governed and determined as desired.

The invention in its broader aspects is not limited to the specific mechanisms shown and described but departures may be made therefrom within the scope of the accompanying claims without departing from the principles of the invention and without sacrificing its chief advantages.

What I claim is:—

1. A dry separator for separating intermixed divided materials including in combination an annular, non-rotatable support, means tending to move the intermixed materials on the support transversely thereof for stratifying them, and means for separately receiving the separated materials from the strata.

2. A mechanism for separating intermixed divided materials including in combination an annular, non-rotatable, vibratable support, means for gradually feeding the intermixed materials to the support, pneumatic means for stratifying the intermixed materials on the support, and means at the periphery of the support for separately receiving the separated materials from the strata.

3. A mechanism for separating intermixed divided materials including in combination an annular, non-rotatable, vibratable, downwardly and outwardly inclined support, pneumatic and mechanical means for moving the intermixed materials along the support and stratifying them, and means at the periphery of the support for separately receiving the separated materials from the strata.

4. A mechanism for separating intermixed divided materials including in combination a support inclined in all directions from a medial point, means for gradually feeding the intermixed materials to the support, means utilizing currents of air for stratifying the intermixed materials on the support, and means for separately receiving the separated materials from the strata.

5. A mechanism for separating intermixed divided materials including in combination a non-rotatable support inclined in all directions from a medial point, means utilizing currents of air for stratifying the intermixed materials on the support, and means all about the periphery of the support for separately receiving the separated materials from the strata.

6. A mechanism for separating intermixed divided materials including in combination a support inclined in all directions from a medial point, means for depositing the intermixed materials medianly upon the support, means for blowing air upwardly through the intermixed material for stratifying it, and means all about the periphery of the support for separately receiving the separated materials from the strata.

7. A mechanism for separating intermixed divided materials including in combination a perforated support inclined in all directions from a medial point, means for gradually feeding the intermixed materials medianly upon the support, means for blowing air through the perforated support, stratifying the intermixed materials on the support, and means all about the periphery of the support for separately receiving the separated materials from the strata.

8. A mechanism for separating intermixed divided materials including in combination a non-rotatable support inclined in all directions from a medial point, pneumatic means for agitating and stratifying the intermixed materials on the support, and means for separately receiving the separated materials from the strata.

9. A mechanism for separating intermixed divided materials including in combination a non-rotatable support inclined in all directions from a medial point, means for gradually feeding the intermixed materials medianly upon the support, means for supplying upwardly flowing air current agitating and stratifying the intermixed materials on the support, and adjustable means for separately receiving the separated materials from the strata.

10. A mechanism for separating intermixed divided materials including in combination a conical support, a material supply located centrally thereof, means utilizing currents of air for agitating and stratifying the intermixed materials as they move along the support and means at the periphery of the support for separately receiving the separated materials from the strata.

11. A mechanism for separating intermixed divided materials including in combination a non-rotatable support, means for vibrating the support and means for passing air upwardly through the support and thereby stratifying the intermixed materials on the support, and means for separately receiving the separated materials from the strata.

12. A mechanism for separating intermixed divided materials including in combination a conical support, means for depositing the intermixed materials medianly upon the support, means for blowing air upwardly through the support, means for vibrating the support and thereby moving the intermixed materials along the support in all directions from the place of deposition and stratifying them, and means for separately receiving the separated materials from the strata.

13. A mechanism for separating intermixed divided materials including in combination a conical air pervious support, means for vibrating the support and thereby stratifying the intermixed materials on the support, means for blowing air upwardly through the support and adjustable means at the periphery of the support for separately receiving the separated materials from the strata.

14. A mechanism for separating intermixed divided materials including in combination an annular support inclined in a plurality of directions, means for vibrating the support, and for blowing air upwardly therethrough, and thereby stratifying the intermixed materials on the support, and means at a plurality of points at the periphery of the support for separately receiving the separated materials from the strata.

15. A mechanism for separating intermixed divided materials including in combination an annular, chambered support perforated in its upper surface, means for supplying air to the chambered support, means for delivering intermixed material onto the support, and means for separately receiving the separated materials.

16. A mechanism for separating intermixed divided materials including in combination an annular, chambered support perforated in its upper surface, means for supplying air to the chambered support, means for delivering intermixed material onto the support, and adjustable means at the edge of the support for separately receiving the separated materials.

17. A mechanism for separating intermixed divided materials including in combination a chambered support, the upper surface of which is conical, downwardly inclined perforated means for supplying air to the chambered support, means for delivering intermixed material onto the upper part of the support, and means for separately receiving the separated materials.

18. A mechanism for separating intermixed divided materials including in combination an annular, chambered support perforated in its upper surface, means for supplying air to the chambered support, means for vibrating the support, means for delivering intermixed material onto the support, and means for separately receiving the separated materials.

19. A mechanism for separating intermixed divided materials including in combination an annular, chambered support perforated in its upper surface, means for supplying air to the chambered support, rotatable means movable over the upper surface of the support for agitating the intermixed material, means for delivering intermixed material onto the support, and means for separately receiving the separated materials.

20. A mechanism for separating intermixed divided materials including in combination an annular, chambered support perforated in its upper surface, means for supplying air to the chambered support, means for vibrating the support, rotatable means movable over the upper surface of the support for agitating the intermixed material, means for delivering intermixed material onto the support, and means for separately receiving the separated materials.

21. A mechanism for separating intermixed divided materials, comprising an inclined support, the upper and lower edges of which are substantially stationary, means for subjecting the intermediate part of the support to a rapid, intense quivering vibration for stratifying the materials, and means for separately receiving the separated materials from the strata.

22. A mechanism for separating intermixed divided materials, comprising an inclined and perforated support, means for subjecting the support to a rapid, quivering transverse vibration of low amplitude, means for blowing air through the support from below, and means for separately receiving the separated materials from the strata.

23. A mechanism for separating intermixed divided materials, comprising an inclined and perforated support, the upper and lower edges of which are substantially stationary, means for subjecting the intermediate part of the support to a rapid, quivering vibration of low amplitude, means for blowing air through the support from below, and means for separately receiving the separated materials at the lower edge of the support.

24. The process of separating intermixed material, comprising passing the material downwardly into areas enlarging continuously and equally in all directions from a central vertical axis, meanwhile subjecting it to vibration and to currents of air blown through it from below.

25. The process of separating intermixed material comprising passing the material downwardly into areas enlarging continuously and equally in all directions from a central vertical axis, under the influence of gravity, mechanical vibration and air currents blown through it from below, for stratifying it.

26. The process of separating intermixed materials comprising utilizing gravity to cause the material to pass downwardly into continuously enlarging areas, meanwhile subjecting it to mechanical vibration, and to air currents blown through it from below, and stirring, for stratifying it.

27. The process of separating intermixed materials which comprises moving the materials into areas enlarging downwardly, continuously and uniformly in all directions from a central vertical axis, and subjecting the material to upward air pressure thereby stratifying and separating the materials and taking off the separated materials separately from the different strata.

28. The process of separating intermixed materials which comprises moving the materials into areas enlarging downwardly, continuously and uniformly in all directions from a central vertical axis, and subjecting the materials to upward air pressure and also agitating the material and thereby stratifying and separating the materials and taking off the separated materials separately from the different strata.

29. A mechanism for separating intermixed divided materials, comprising in combination an annular, downwardly and outwardly inclined, non-rotatable, air pervious support, means for passing air upwardly through the support for agitating and stratifying the materials, and means extending around the lower, outer edge of the support for separately receiving the different strata.

30. A mechanism for separating intermixed divided materials, comprising in combination an annular, downwardly and outwardly inclined, non-rotatable, air pervious support, means for passing air upwardly through the support for agitating and stratifying the materials, means for mechanically vibrating the support for further agitating and stratifying the materials, and means extending around the lower, outer edge of the support for separately receiving the different strata.

31. A mechanism for separating intermixed divided materials, comprising in combination an annular, downwardly and outwardly inclined, non-rotatable, air pervious support, means for passing air upwardly through the support for agitating and stratifying the materials, means for mechanically vibrating the support for further agitating and stratifying the materials, stirring means on the support for stirring the materials thereon, and means extending around the lower, outer edge of the support for separately receiving the different strata.

32. The process of separating intermixed, divided materials which comprises causing the materials to pass downwardly by gravity, meanwhile subjecting them to mechanical vibration, to air currents blown through them from below, and to stirring, for stratifying them.

33. The process of separating intermixed, divided materials, which comprises causing the materials to pass downwardly and outwardly from a medial point by gravity, meanwhile subjecting them to mechanical vibration in a direction transverse to their course, to air currents blown through them from below, and to stirring, for stratifying them.

34. The process of separating intermixed, divided materials which comprises causing the materials to pass downwardly and outwardly from a medial point by gravity, meanwhile subjecting them to rapid mechanical vibration, to air currents blown through them from below, and to stirring, for stratifying them.

35. A mechanism for separating intermixed, divided materials comprising in combination air-pervious means for directing the materials in a downward and outward path, means to rapidly vibrate said air pervious means in a direction transverse to said path, and means for passing air upwardly through said air-pervious means to agitate and stratify said materials during their movement.

36. A mechanism for separating intermixed, divided materials comprising in combination non-rotatable air-pervious means for directing the materials in a downward and outward path, means for passing air upwardly through said air-pervious means to agitate and stratify said materials during their movement, means to stir said materials, and means to vibrate said air-pervious means.

37. The process of separating intermixed divided materials comprising moving the materials downwardly, and spreading the downwardly moving materials laterally in all directions over a continuously enlarging air-pervious surface, and passing air currents through said downwardly and laterally moving materials while on the air-pervious surface.

In testimony whereof, I have signed my name to this specification.

KENNETH DAVIS.